(12) United States Patent
Sado et al.

(10) Patent No.: US 7,477,472 B2
(45) Date of Patent: Jan. 13, 2009

(54) METHOD AND APPARATUS FOR WRITING SERVO DATA IN A DISK DRIVE USING SPIRAL SERVO PATTERNS

(75) Inventors: Hideo Sado, Ome (JP); Masahide Yatsu, Akishima (JP); Katsuki Ueda, Ome (JP); Toshitaka Matsunaga, Ome (JP); Seiji Mizukoshi, Nishitama (JP); Shouji Nakajima, Kodaira (JP); Shinichirou Kouhara, Hin (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/976,822

(22) Filed: Oct. 29, 2007

(65) Prior Publication Data

US 2008/0130160 A1   Jun. 5, 2008

(30) Foreign Application Priority Data

Dec. 1, 2006   (JP)   .............................. 2006-325998

(51) Int. Cl.
  *G11B 21/02*   (2006.01)
(52) U.S. Cl. ....................................................... 360/75
(58) Field of Classification Search .................. 360/75, 360/29, 31, 77.05, 77.08, 78.14, 126
See application file for complete search history.

(56) References Cited

U.S. PATENT DOCUMENTS

| | | | |
|---|---|---|---|
| 4,107,746 A * | 8/1978 | Conway | ................... 360/78.14 |
| 5,668,679 A | 9/1997 | Swearingen et al. | |
| 6,987,646 B2 | 1/2006 | Hsiao et al. | |
| 7,002,761 B1 * | 2/2006 | Sutardja et al. | ............... 360/29 |
| 7,095,575 B2 | 8/2006 | Miyata et al. | |
| 7,307,806 B1 * | 12/2007 | Sutardja et al. | ............... 360/29 |
| 2004/0213108 A1 | 10/2004 | Fujiune | |

FOREIGN PATENT DOCUMENTS

JP     2003-141837     5/2003

* cited by examiner

*Primary Examiner*—Fred Tzeng
(74) *Attorney, Agent, or Firm*—Pillsbury Winthrop Shaw Pittman, LLP

(57) ABSTRACT

According to one embodiment, a method of writing a target servo pattern constituting concentric servo tracks on a disk medium provided in a disk drive. In the method, a cumulative amplitude value of the waveform of each spiral servo pattern reproduced by the head of the disk drive is calculated, a slope of each spiral servo pattern is calculated from the cumulative amplitude value, and a pitch at which the head should be moved to write the target servo pattern is determined on the basis of the slopes of the spiral servo patterns.

11 Claims, 6 Drawing Sheets

METHOD AND APPARATUS FOR WRITING SERVO DATA IN A DISK DRIVE USING SPIRAL SERVO PATTERNS

CROSS-REFERENCE TO RELATED APPLICATIONS

This application is based upon and claims the benefit of priority from Japanese Patent Application No. 2006-325998, filed Dec. 1, 2006, the entire contents of which are incorporated herein by reference.

BACKGROUND

1. Field

One embodiment of the present invention generally relates to a disk drive and particularly to a method and apparatus for writing servo data in a disk drive, by using spiral servo patterns.

2. Description of the Related Art

In most disk drives, a representative example of which is a hard disk drive, the positioning of the heads is controlled in accordance with the serve data (servo pattern) that is recorded on disk-shaped media, i.e., data-recording media. That is, the heads are moved to target positions (i.e., target tracks) on the disk-shaped media, in accordance with the servo data the heads have read.

The servo data recorded on any disk medium provided in a disk drive is recorded in servo sectors that are arranged at regular intervals in the circumferential direction of the disk medium. The servo sectors constitute concentric servo tracks. In the disk drive, a head is moved to a position over the disk medium, in accordance with the servo data. The head thus positioned records data on the disk medium, forming concentric data tracks.

The servo data is recorded on the disk medium in the servo-writing step included in the manufacture of the disk drive. A method of recording spiral servo patterns (hereinafter referred to as spiral servo patterns), i.e., base pattern, on a disk medium in the servo-writing step has been proposed (see, for example, U.S. Pat. No. 6,987,646B1 and U.S. Pat. No. 5,668,679).

In this method, a servo pattern (hereinafter called target servo pattern, for convenience), which will be used as a product servo pattern, is written on the disk medium. The target servo pattern is servo data that constitutes the above-mentioned concentric servo tracks. The disk drive to be shipped as product incorporates disk-shaped media, on each of which a target servo pattern is recorded.

In the method of writing servo data, described above, the density of the concentric servo tracks constituted by the target servo pattern is determined from the slope of the spiral servo patterns, after the target servo pattern has been written. Hence, the density of the concentric servo tracks changes as the slope of the spiral servo patterns changes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of writing servo data, which can form servo tracks at a stable density even if the slope of the spiral servo patterns changes.

(Configuration of the Disk Drive)

Figure 1:
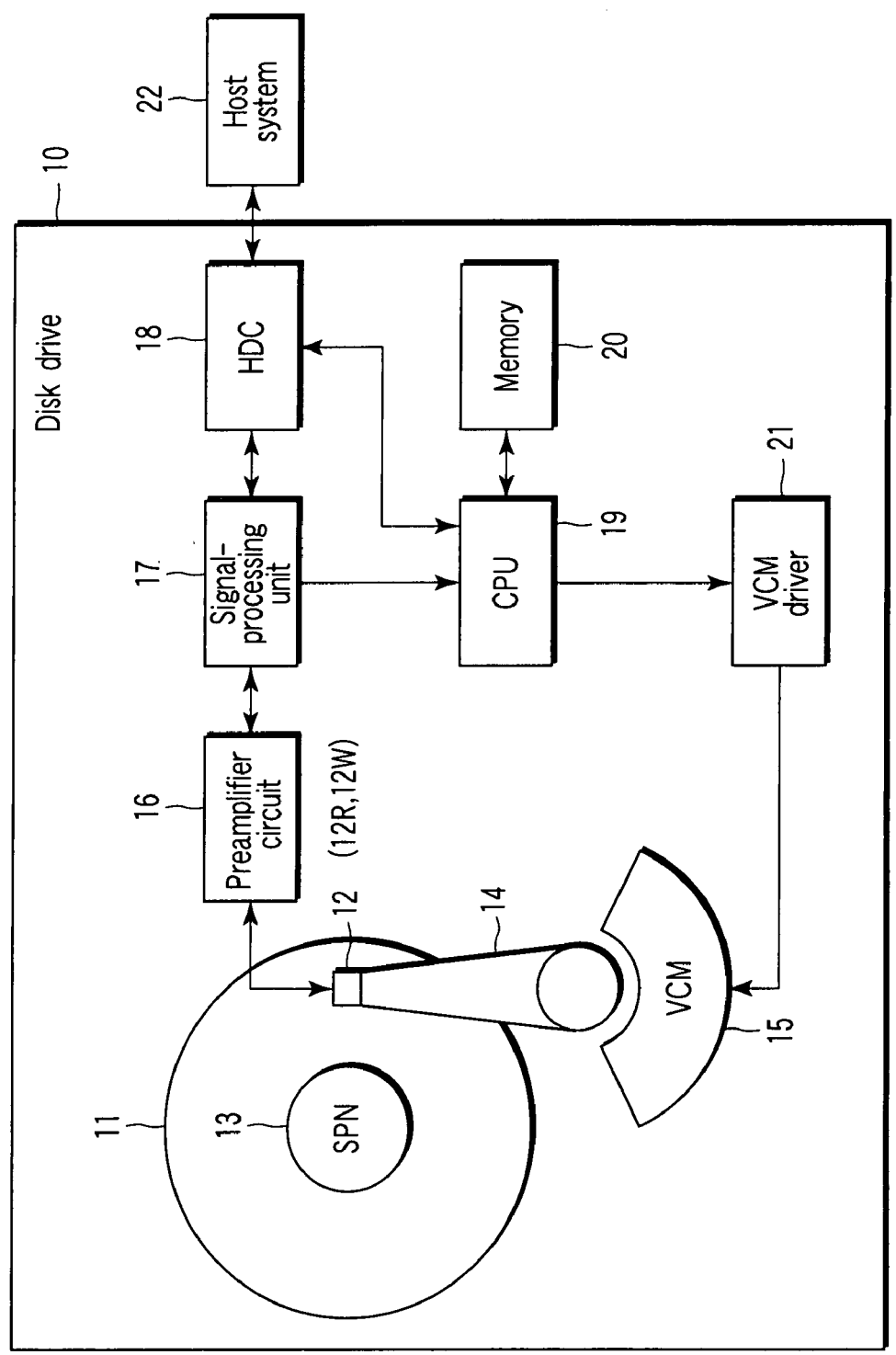
FIG. 1 is a block diagram showing the major components of a disk drive according to an embodiment of this invention.

FIG. 1 is a block diagram showing the configuration of a disk drive according to this embodiment.

The disk drive 10 according to the embodiment is a hard disk drive that incorporates a disk medium 11 that is a magnetic recording medium. A plurality of spiral servo patterns are recorded on the disk medium 11 as will be described later. The disk medium 11 is secured to a spindle motor (SPM) 13 and can be rotated at high speed in the disk drive 10.

The disk drive 10 has a head 12, which includes a read head 12R and a write head 12W. The read head 12R is configured to read data (i.e., servo data and user data). The write head 12W is designed to write data. The head 12 is mounted on an actuator 14, which is driven by a voice coil motor (VCM) 15. The servo data may be herein referred to as a servo pattern.

The VCM 15 is driven and controlled by a drive current supplied from a VCM driver 21. The actuator 14 is a head-moving mechanism for moving the head 12 to a desired position (i.e., target position) over the disk medium 11. The actuator 14 is driven and controlled by a microprocessor (CPU) 19, which will be described later.

The disk drive 19 has, in addition to the head-disk assembly described above, a preamplifier circuit 16, a signal-processing unit 17, a disk controller (HDC) 18, a CPU 19, and a memory 20.

The preamplifier circuit 16 has a read amplifier and a write amplifier. The read amplifier amplifies a read-data signal output from the read head 12R. The write amplifier amplifies a write-data signal output from the write head 12W. That is, the write amplifier converts the write-data signal output from the signal-processing unit 17 to a write-current signal, which is supplied to the write head 12W.

The signal-processing unit 17 is a read/write channel that processes a read/write data signal. (The read/write data signal contains a servo signal corresponding to a servo pattern). The signal-processing unit 17 includes a servo decoder that reproduces servo data (i.e., servo patterns) from the servo signal.

The HDC 18 has the function of connecting the drive 10 to a host system 22 (e.g., a personal computer or a digital apparatus). The HDC 18 can control the transfer of the read/write data between the disk medium 11 and the host system 22.

The CPU 19 is the main controller of the drive 10 and performs the head-positioning control and the ordinary user-data read/write control. The memory 20 includes a RAM and a ROM, as well as a flash memory (flash EEPROM), i.e., a nonvolatile memory. The memory 20 store various data items and various programs, all required for controlling the CPU 19.

In the embodiment, the CPU 19 performs so-called self-servo writing, thereby writing, in a servo-writing step, a target servo pattern that constitutes concentric servo tracks on the disk medium 11 as will be described later. The target servo pattern is servo data that is used to achieve the positioning control of the head 12.

(Reproduction of the Spiral Servo Patterns)

In the present embodiment, a dedicated servo-track writer (STW) has written spiral servo patterns as a base pattern on the disk medium 11 in the servo-data writing step during the manufacture of the disk drive 10 (see U.S. Pat. No. 6,987,636B1).

After the spiral servo patterns have been written in the servo-data writing step on the disk medium 11 incorporated in the disk drive 10, the CPU 19 of the disk drive 10 performs self-servo writing, thereby writing the target servo pattern, by using the spiral servo patterns. That is, the CPU 19 cases the write head 12W to write, on the disk medium 11, the target servo pattern that will be used as a product, while it is controlling the positioning of the head 12 in accordance with the spiral servo patterns.

Note that the STW makes the head move to write a pattern repeatedly as if writing letters in one stroke, thus recording spiral servo patterns (also known as spiral servo wedges) on the disk medium 11.

Figure 8:
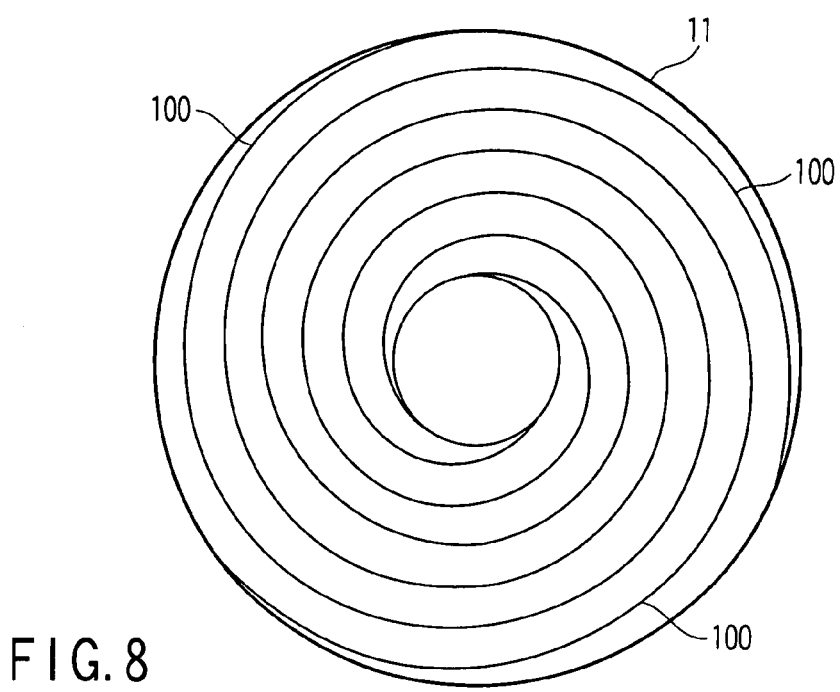
FIG. 8 is a diagram showing an example of spiral servo patterns according to the embodiment.

FIG. 8 is a diagram showing an example of spiral servo patterns 100 written on the disk medium 11. As in most cases, the spiral servo patterns are written in the same way as letters are written in one stroke. The spiral servo patterns 100 may be written by either a spiral servo write or the disk drive 10. The CPU 19 makes the write head 12W write the target servo pattern, while controlling the positioning of the write head 12W in accordance with the spiral servo patterns reproduced by the read head 12R.

Figure 2A:
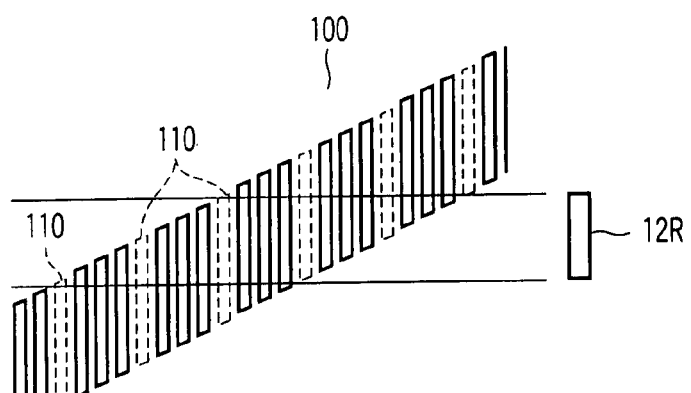
FIGS. 2A to 2C are diagrams representing the waveforms reproduced of spiral servo patterns according to the embodiment.

FIG. 2A is a diagram showing a part of a spiral servo pattern 100. Each spiral pattern 100 is composed of a signal pattern that has bit-absent parts 110 (equivalent to sync marks). The spiral servo pattern 100 is recorded extending slantwise to the circumferential direction of the disk medium 11. FIG. 2A shows the read head 12R moving relative to the medium 11 in the circumferential direction of the medium 11, thus crossing the spiral servo pattern 100.

Figure 2B:
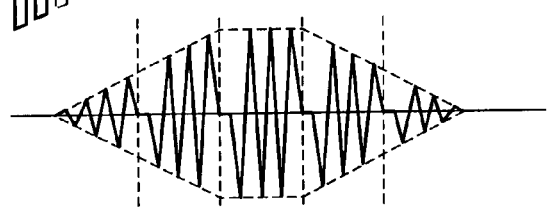
Figure 2C:
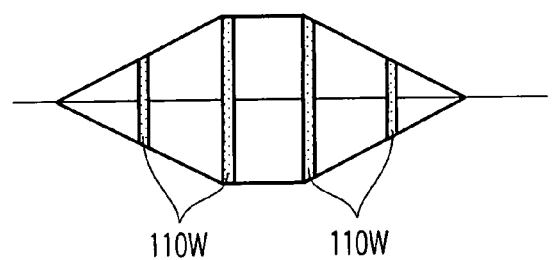

FIG. 2B shows the waveform of the spiral servo pattern 100 reproduced by the read head 12R. In FIG. 2B, the broken lines extending vertically indicate the parts corresponding to the bit-absent parts 110. The read head 12R outputs a burst signal pattern having an envelop that is almost hexagonal because it moves in the circumferential direction of the medium 11 and reproduces the spiral servo pattern 100 extending slantwise to the circumferential direction. FIG. 2C shows only the envelope of the waveform of the spiral servo pattern 100 reproduced. In FIG. 2C, the vertical lines indicate the parts that correspond to the bit-absent parts 110 of the spiral servo pattern 100.

Figure 3A:
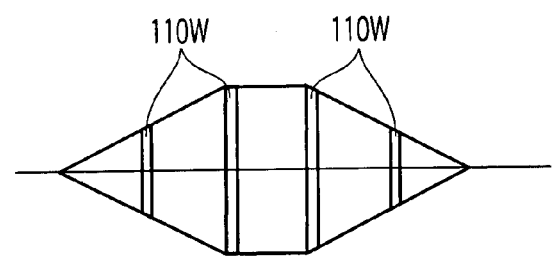
FIGS. 3A to 3C are diagrams explaining a method of decoding spiral servo patterns according to the embodiment.
Figure 3B:
Figure 3C:
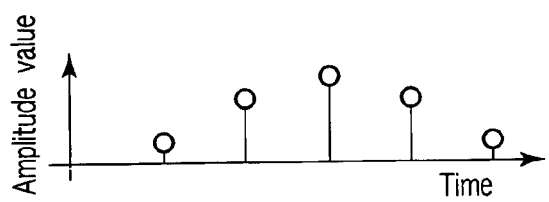

The servo decoder provided in the signal-processing unit 17 acquires amplitude values shown in FIG. 3C from the waveform shown in FIG. 3A, in synchronism with decoding-gate sections (i.e., frames) illustrated in FIG. 3B. The decode-gate sections are set at the same intervals as the bit-absent portions 110W.

The CPU 19 acquires the amplitude values, which are digital values and synchronous with the decoding-gate sections, from the signal-processing unit 17. From the amplitude values the CPU 19 calculates the position of the head 12 (more precisely, the position of the read head 12R). That is, the CPU 19 finds the position error the read head 12R has in its radial direction with respect to the centerline of a servo track (i.e., the straight line shown in FIG. 3A).

(Process of Writing the Servo Data)

How the self-servo writing is performed to write the servo data in the present embodiment will be explained, with the reference to FIG. 4A to 4D, FIG. 5A to 5D and FIGS. 6A and 6B and to the flowchart of FIG. 7.

First, the CPU 19 drives the VCM driver 21, which in turn drives the VCM 15. Driven by the VCM driver 21, the VCM 15 rotates the actuator 14, which moves the head 12 from the innermost part of the disk medium 11 toward the outermost part thereof. While being so moved, the head 12 (more precisely, the writing head 12W) writes a target servo pattern on the disk medium 11. The target servo pattern is a servo pattern which will be used in a disk drive as a product and which constitutes concentric servo tracks.

Figure 6A:
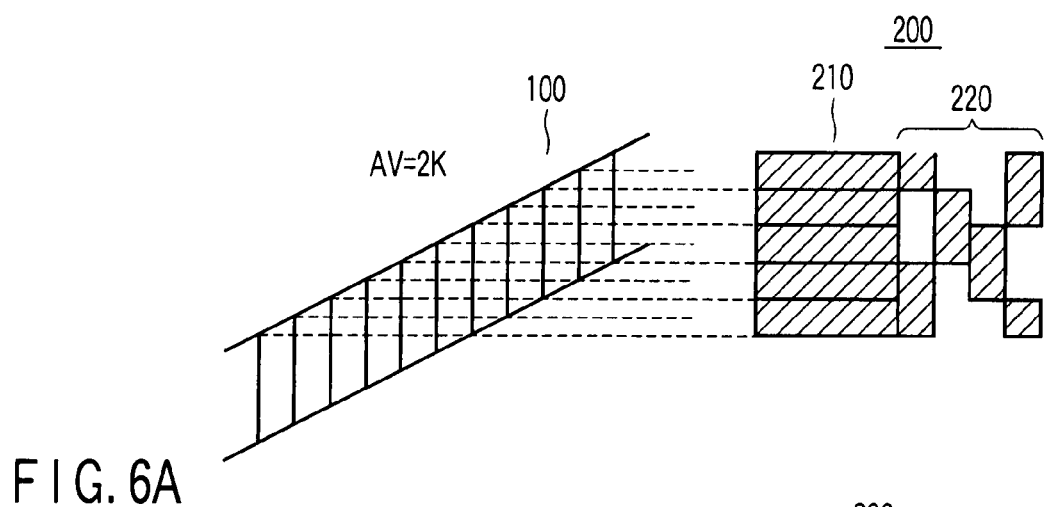
FIGS. 6A and 6B are diagrams showing the relation between the spiral servo patterns according to the embodiment and a target servo pattern.
Figure 6B:
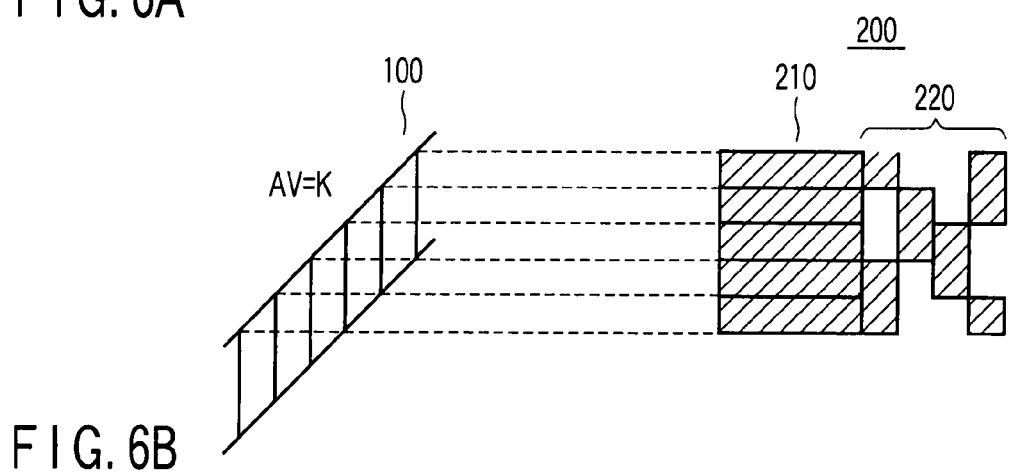
Figure 7:
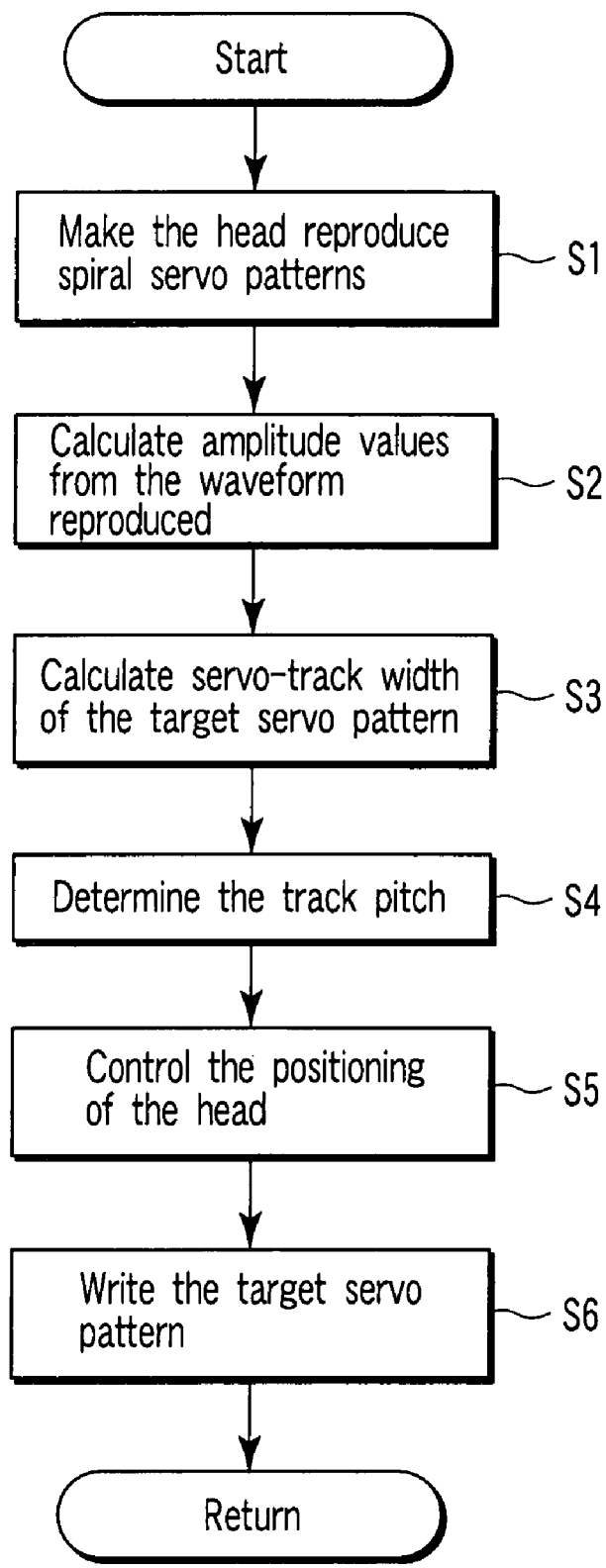
FIG. 7 is a flowchart explaining the sequence of writing the servo data according to the embodiment.

More specifically, the write head 12W is positioned on the basis of the spiral servo pattern 100 as shown in FIGS. 6A and 6B. A target servo pattern 200 is thereby written on the disk medium 11. The target servo pattern 200 thus written constitutes servo tracks arranged at preset intervals. The target servo pattern 200 contains track addresses (or cylinder codes) 210 and servo-burst patterns (position-detecting data) 220.

In order to move the head 12, the CPU 19 makes the read head 12R reproduce the spiral servo patterns 100 (Step S1). The CPU 19 calculates the radial direction of the read head 12R from the amplitude values of the waveform reproduced, which have been obtained by the servo decoder provided in the signal-processing unit 17. Then, the CPU 19 controls the position of the VCM driver 21 so that the write head 12W may move to the centerline of one of the servo tracks constituted by the target servo pattern 200. In other words, the CPU 19 performs control to move the write head 12W to the centerline of a servo track that is a designated position on the disk medium 11.

At this point, the target servo pattern 200 is written on the disk medium 11 so that servo tracks may be provided spaced apart at regular intervals. More specifically, the CPU 19 determines the distance by which the head 12 should be moved each time to provide the servo tracks at a prescribed pitch. Note that the servo tracks have a width that is determined on the basis of the width of the write head 12R.

Figure 4A:
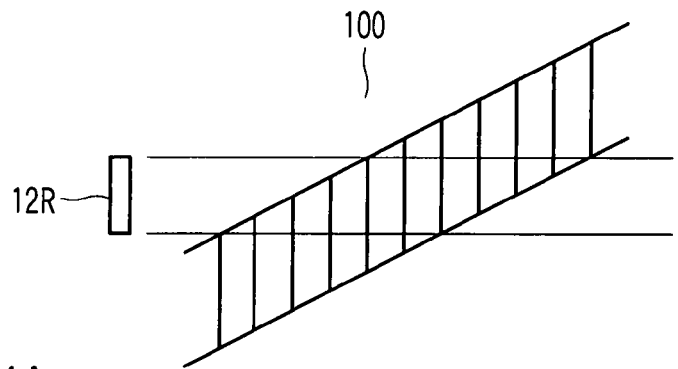
FIGS. 4A to 4D are diagrams explaining a method of calculating the slope of the spiral servo patterns according to the embodiment.
Figure 4B:
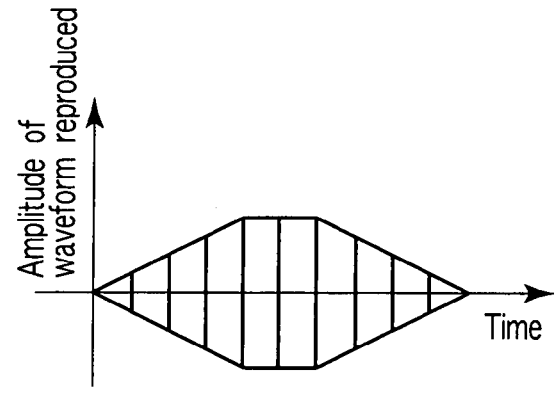

As FIG. 4A shows, each spiral servo pattern 100 recorded on the disk medium 11 extend slantwise to the circumferential direction of the medium 11. If the target servo pattern 200 is written on the basis of this spiral servo pattern 100, its track pitch will depend on the slope of the spiral servo pattern 100 as in most cases. That is, if the spiral servo pattern 100 inclines a little, the target servo pattern 200 will have a short track pitch (that is, the tracks will be densely arranged). Conversely, if the spiral servo pattern 100 greatly inclines, the target servo pattern 200 will have a long track pitch (that is, the tracks will be sparsely arranged).

In this embodiment, the CPU 19 calculates the slope of each spiral servo pattern 100 recorded on the disk medium 11, and the track pitch of the target servo pattern 200 is determined from the slope of the spiral servo pattern 100 (Step S4). In other words, the target servo pattern 200 is written on the basis of the designated servo-track density (number of tracks), and not based on the slope of the spiral servo patterns, so that the servo tracks may be arranged at regular intervals (Step S6). How the target servo pattern 200 is so written will be explained in detail.

Figure 4C:
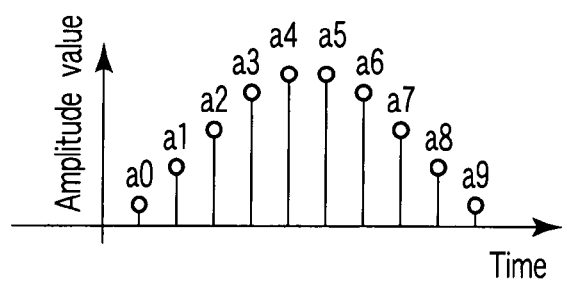
Figure 4D:
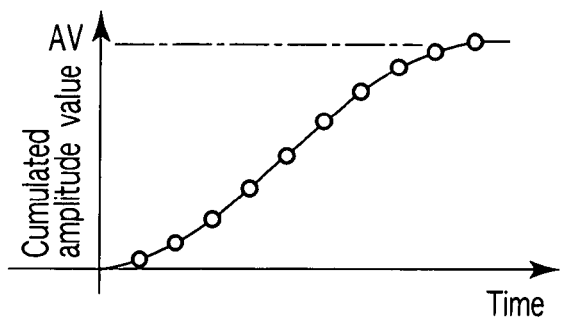
Figure 5A:
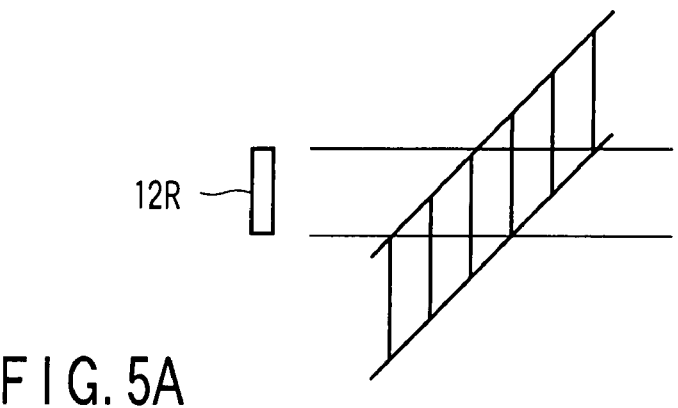
FIGS. 5A to 5D are another diagrams explaining a method of calculating the slope of the spiral servo patterns according to the embodiment.
Figure 5B:
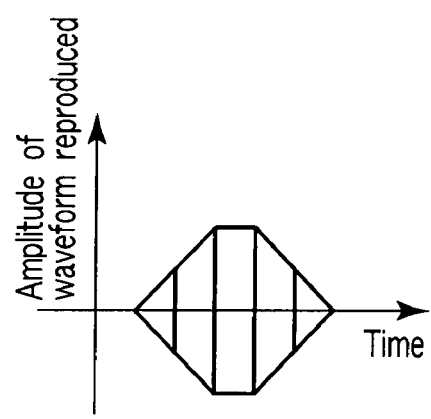
Figure 5C:
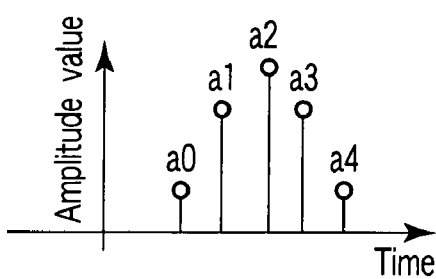
Figure 5D:
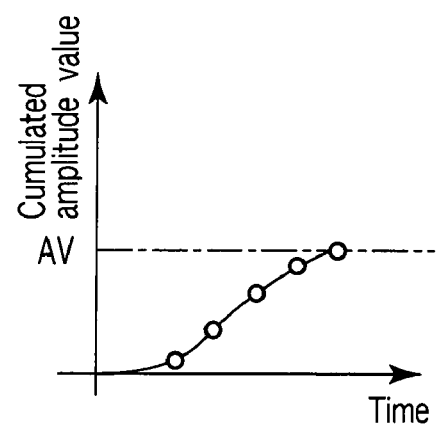

The CPU 19 obtains cumulative amplitude values by adding the amplitude values detected from the waveform of the spiral servo pattern 100 that has been reproduced, as is illustrated in FIG. 4D or FIG. 5D (Step S2). The CPU 19 finds the slope of the spiral servo pattern 100 from the cumulative amplitude values.

FIG. 4A shows a spiral servo pattern 100 that has a relatively gentle slope. On the other hand, FIG. 5A shows a spiral servo pattern 100 that has a relatively steep slope. The servo decoder provided in the signal-processing unit 17 generates an amplitude value shown in FIG. 4C, from the waveform shown in FIG. 4B. Similarly, the servo decoder generates an amplitude value shown in FIG. 5C, from the waveform shown in FIG. 5B.

For each frame (decoding-gate section) shown in FIG. 3B, a cumulative amplitude value AV can be calculated as follows, if amplitude values a0 to a9 are available as shown in FIG. 4C.

$$AV = \Sigma ak \quad (1)$$

where k is 0 to 9.

The equation (1) teaches that the cumulative amplitude value AV is comparatively large if the spiral servo pattern 100 has a gentle slope, and that the cumulative amplitude value AV is comparatively small if the spiral servo pattern 100 has a steep slope. That is, the reciprocal of the cumulative amplitude value AV is proportional to the slope of the spiral servo pattern 100.

As in most cases, the track pitch of the target servo pattern 200 depends on the slop of the spiral servo pattern 100. Hence, the servo-track width of the target servo pattern 200 will be proportional to the slope of the spiral servo pattern 100 if the target servo pattern 200 is written on the basis of the spiral servo pattern 100. Therefore, the track pitch of the target servo pattern 200 will be narrow if the slope of the spiral servo pattern 100 is gentle. Conversely, the track pitch of the target servo pattern 200 will be wide if the slope of the spiral servo pattern 100 is steep.

In brief, the CPU 19 first finds the cumulative amplitude value AV and then calculates the slope of the spiral servo pattern 100 from the reciprocal of the cumulative amplitude value AV. Further, the CPU 19 calculates the servo-track width of the target servo pattern 200 from the slope of the spiral servo pattern 100 (Step S3). The servo-track width therefore depends upon the slope of the spiral servo pattern 100.

In the present embodiment, the target servo pattern 200 that constitutes servo tracks, which are spaced at regular intervals, is written on the basis of the designated servo-track density (number of tracks), and not on the basis of the slope of the spiral servo patterns. In other words, the CPU 19 determines the distance (i.e., track pitch) by which the head 12 should be moved each time, regardless of the slope of the spiral servo pattern 100, so that servo tracks may be arranged at regular intervals (Step S4). More specifically, the CPU 19 determines that distance (i.e., track pitch), which is proportional to the slope of the spiral servo pattern 100.

The distance TP (i.e., track pitch) by which the head 12 should be moved each time can be calculated as follows:

$$TP = AV/K \quad (2)$$

where AV is the cumulative amplitude value.

Note that the unit of TP is number of tracks. The equation (2) teaches that the track width of the spiral servo pattern 100, with respect to the servo-track width of the target servo pattern 200, is proportional to the reciprocal of TP (AV/K).

The sum N of the servo-track widths over the entire area in which the spiral servo patterns 100 are recorded can be calculated as follows:

$$N = \Sigma(K/AV) = K(\Sigma 1/AV)) \quad (3)$$

K can therefore be obtained as follows:

$$K = N/(\Sigma(1/AV)) \quad (4)$$

where N is the number of tracks to be written in the entire area of the disk medium 11. Thus, the distance by which to move the head 12 each time, i.e., track pitch TP, can be found as follows:

$$TP = AV/K = (AV(\Sigma(1/AV)))/N \quad (5)$$

In other words, the product of the cumulative amplitude value AV and correction coefficient $\Sigma(1/AV))/N$ may be used as track pitch TP.

As described above, the CPU 19 makes the read head 12R reproduce the spiral servo patterns 100 recorded on the disk medium 11, controls the positioning of the head 12 in accordance with the spiral servo patterns 100, and makes the writing head 12W write the target servo pattern 200 that constitutes concentric servo tracks on the disk medium 11 (Steps S5 and S6).

In this case, the CPU 19 calculates a cumulative amplitude value AV that depends on a slope of the spiral servo pattern 100. From the cumulative amplitude value AV the CPU 19 determines the distance (i.e., track pitch TP) by which to move the head 12 to write the target servo pattern 200. The target servo pattern 200 composed of servo tracks arranged at regular intervals can therefore be written on the basis of the number of tracks to be recorded on the disk medium 11, and not on the basis of the slope of the spiral servo patterns 100.

More specifically, if the slope of the spiral servo pattern 100 is gentle as shown in FIG. 6A, the head 12 is moved by, for example, a two-track distance each time on the basis of the cumulative amplitude value AV (AV=2K). In this case, the target servo pattern 200 can be written at a relatively short track pitch.

On the other hand, if the slope of the spiral servo pattern 100 is steep, as shown in FIG. 6B, the head 12 is moved by, for example, a one-track distance each time on the basis of the cumulative amplitude value AV (AV=K). In this case, the target servo pattern 200 can be written at a relatively long track pitch.

In the disk drive 10, the amplitude value of the reproduced waveform shown in FIG. 2B changes with the position of the head 12. If the amplitude value so changes, it suffices to normalize the amplitude value by using the maximum amplitude max(a) as reference.

More precisely, the cumulative amplitude value AV can be calculated by using the following equation (6).

$$AV = \Sigma(a/\max(a)) \quad (6)$$

As described above, the cumulative amplitude value of the reproduced waveform is used to calculate the slope of the spiral servo pattern 100 in the present embodiment. Nonetheless, the slope of the spiral servo pattern 100 may be calculated by any other method. For example, it may be calculated by using the width of the waveform envelope (as measured along the time axis). With this embodiment it is possible to write servo tracks at regular intervals even if the slope of the spiral servo pattern changes. This provides a method of writing servo data, which can form servo tracks at a stable density.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of writing servo data, for use in a disk drive that has a disk medium on which a plurality of spiral servo patterns are recorded and a head which is configured to read and write data on the disk medium, the method designed to control the positioning of the head in accordance with the plurality of spiral servo patterns and write, on the disk medium, a target servo pattern constituting concentric servo tracks, and the method comprising:

causing the head to reproduce the spiral servo patterns from the disk medium;
   calculating a cumulative amplitude value of the waveform of each spiral servo pattern reproduced; and
   calculating a slope of each spiral servo pattern on the basis of the cumulative amplitude value.

2. The method according to claim 1, further comprising calculating intervals of the concentric servo tracks on the basis of the slope of the spiral servo track.

3. The method according to claim 1, further comprising the steps of:

calculating intervals of the concentric servo tracks on the basis of the slope of the spiral servo track; and
   determining a pitch at which the head should be moved to write the target servo pattern, on the basis of the intervals of the concentric servo tracks.

4. The method according to claim 1, further comprising the steps of:

calculating intervals of the concentric servo tracks on the basis of the slope of the spiral servo track; and
   determining a pitch at which the head should be moved to write the target servo pattern, on the basis of the number of data tracks formed on the disk medium when the target servo pattern is written on the basis of the intervals of the concentric servo tracks.

5. A method of writing servo data, for use in a disk drive that has a disk medium on which a plurality of spiral servo patterns are recorded and a head which is configured to read and write data on the disk medium, the method designed to control the positioning of the head in accordance with the plurality of spiral servo patterns and write, on the disk medium, a target servo pattern constituting concentric servo tracks, and the method comprising:

calculating slopes of the spiral servo patterns formed on the entire area of the disk medium, before the target servo pattern is written; and
   determining a pitch at which the head should be moved to write the target servo pattern, on the basis of the slopes of the spiral servo patterns.

6. A disk drive comprising:
   a disk medium on which a plurality of spiral servo patterns are recorded;
   a unit which reproduces the spiral servo patterns by using a head;
   a unit which calculates a cumulative amplitude value of the waveform of each spiral servo pattern reproduced;
   a unit which calculates a slope of each spiral servo pattern on the basis of the cumulative amplitude value;
   a unit which positions the head on the basis of each spiral servo pattern and the slope thereof; and
   a unit which causes the head to write, on the disk medium, a target servo pattern constituting concentric servo tracks.

7. The disk drive according to claim 6, further comprising a unit which calculates intervals of the concentric servo tracks on the basis of the slope of the spiral servo track.

8. The disk drive according to claim 6, further comprising:
   a unit which calculates intervals of the concentric servo tracks on the basis of the slope of the spiral servo track; and
   a unit which determines a pitch at which the head should be moved to write the target servo pattern, on the basis of the intervals of the concentric servo tracks.

9. The disk drive according to claim 6, further comprising:
   a unit which calculates intervals of the concentric servo tracks on the basis of the slope of the spiral servo track; and
   a unit which determines a pitch at which the head should be moved to write the target servo pattern, on the basis of the number of data tracks formed on the disk medium when the target servo pattern is written on the basis of the intervals of the concentric servo tracks.

10. The disk drive according to claim 6, wherein the head has a read head which reproduces the spiral servo patterns form the disk medium, and a write head which writes, on the disk medium, a target servo pattern constituting concentric servo tracks.

11. A servo-data writing apparatus for use in a disk drive that has a disk medium on which a plurality of spiral servo patterns are recorded and a head which is configured to read and write data on the disk medium, the apparatus designed to write a target servo pattern constituting concentric servo tracks and the apparatus comprising:

a unit which calculates slopes of the spiral servo patterns formed on the entire area of the disk medium, before the target servo pattern is written;
   a unit which determines a pitch at which the head should be moved to write the target servo pattern, on the basis of the slopes of the spiral servo patterns; and
   a unit which causes the head to write the target servo pattern, on the disk medium.

* * * * *